(12) United States Patent
Egan et al.

(10) Patent No.: US 6,937,572 B1
(45) Date of Patent: Aug. 30, 2005

(54) CALL TRACE ON A PACKET SWITCHED NETWORK

(75) Inventors: Brian B. Egan, Ontario (CA); Milos Vodsedalek, Ontario (CA)

(73) Assignee: Nortel Networks Limited, St. Laurent (CA)

( * ) Notice: Subject to any disclaimer, the term of this patent is extended or adjusted under 35 U.S.C. 154(b) by 794 days.

(21) Appl. No.: 09/751,796

(22) Filed: Dec. 29, 2000

(51) Int. Cl.[7] ............................................. G01R 31/08
(52) U.S. Cl. ...................... 370/252; 709/224
(58) Field of Search ................. 370/252–254, 370/260–9, 351–7, 469; 709/223–5; 345/732–745

(56) References Cited

U.S. PATENT DOCUMENTS

| | | | |
|---|---|---|---|
| 6,144,336 A * | 11/2000 | Preston et al. | 342/357.09 |
| 6,636,504 B1 * | 10/2003 | Albers et al. | 370/352 |
| 6,643,267 B1 * | 11/2003 | Karia et al. | 370/252 |
| 6,681,232 B1 * | 1/2004 | Sistanizadeh et al. | 707/104.1 |
| 6,721,184 B1 * | 4/2004 | Lehmeier et al. | 361/728 |
| 2002/0114274 A1 * | 8/2002 | Sturges et al. | 370/229 |

OTHER PUBLICATIONS

Stevens, Richard; TCP/IP Illustrated, vol. 1; 1994; Addison-Wesley, pp. 263-265, 97-109.*

* cited by examiner

Primary Examiner—David Vincent
(74) Attorney, Agent, or Firm—Mintz Levin Cohn Ferris Glovsky & Popeo P.C.

(57) ABSTRACT

A call trace feature for a network compatible device, such as a voice over Internet Protocol device. The call trace information may include an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

26 Claims, 1 Drawing Sheet

CALL TRACE ON A PACKET SWITCHED NETWORK

BACKGROUND OF THE INVENTION

1. Field of the Invention

The invention relates to providing call trace information on a packet switched network to users of various network compatible devices, such as telephone sets, personal digital assistants, soft phones and the like.

2. Discussion of Related Art

Support for end-to-end voice calls using the Internet as an alternative to traditional public switched telephone networks (PSTN) is well known. Unlike the PSTN, which is circuit-switched, the Internet is packet-switched; communication on the Internet is accomplished by transmitting and receiving packets of data.

In addition to data, each packet contains an address to ensure that it is routed correctly. The format of these packets is defined by the Internet Protocol (IP).

One type of allowable data is encoded, digitized voice. Voice over IP (VoIP) is encoded digitized voice that is packetized in accordance with IP, and communicated over the Internet for telephone-like communication.

A service provider can off-load branch-office voice traffic from the PSTN and route it across the company's existing packet switched data intranet, thereby eliminating toll charges. In addition, interoffice fax traffic can be routed across a company's data network or through an extranet, using existing fax machines, key systems, Centrexes, and PBXs, making the process of placing calls over the IP network transparent to users.

Users of VoIP devices currently are not provided with call trace information. Such call trace information could be useful in a variety of applications.

For instance, it would be useful for emergency E911 (electronic 911) service to help emergency personnel determine critical information about an IP client in advance of rendering emergency service. Such call trace information would also be useful for tracking down and apprehending prank callers who use VoIP. Even misbehaving IP clients could be identified and reprimanded or shut down by network administrators that have access to such call trace information. In addition, call trace information may serve as critical debugging information to help network servicing personnel determine network faults and the like.

The name and number information of the called party may be linked to address and geographic location information about a called party. If geographic information about the called party of a VoIP call were known to the caller, the caller would then be in a position to know whether the call is costly due to the geographic distance from the called party and whether the call to be placed is being received in a different time zone. If the caller is a retail merchant, geographical information about the called party may be useful in deciding whether to ship certain products to certain geographical zones.

It would be advantageous to provide call trace information to users and/or administrators of network compatible devices. Such users and/or administrators would then be informed about a caller's end-point device in advance of taking some action with respect to that caller or caller's end-point device.

SUMMARY OF THE INVENTION

An aspect of the invention relates to providing call trace information about a caller's end-point device that communicates on a packet switched network. The end-point device may be a voice over Internet Protocol (VoIP) device, which operates using voice that is packetized in accordance with Internet Protocol (IP) and transmitted over the Internet.

The call trace information may include the following about the end-point VoIP device: the IP address, the geographical location of the end-point device and the type or class of the end-point device. In addition, the call trace information may provide the call route and the topology of the route, the domain name server (DNS) of the IP address and route, the directory number and name and the call back number for the user. Further, the call trace information may inform about whether the IP address for the end-point device is mobile and what redirection may have occurred before the call was completed.

In the case of a conference call, a further aspect of the invention is to provide a feature that enables call trace information about each one of the conferees to be delivered back to the originator of the conference call, whether the conference is a voice, video or chat session. Even a circuit switched time division multiplex (TDM) device may activate this feature if it is connected to an end-point VoIP device through a gateway.

BRIEF DESCRIPTION OF THE DRAWING

For a better understanding of the present invention, reference is made to the following description and accompanying drawings, while the scope of the invention is set forth in the appended claims.

The drawing is a schematic representation of a network having network compatible devices.

DETAILED DESCRIPTION OF THE INVENTION

Figure 1:
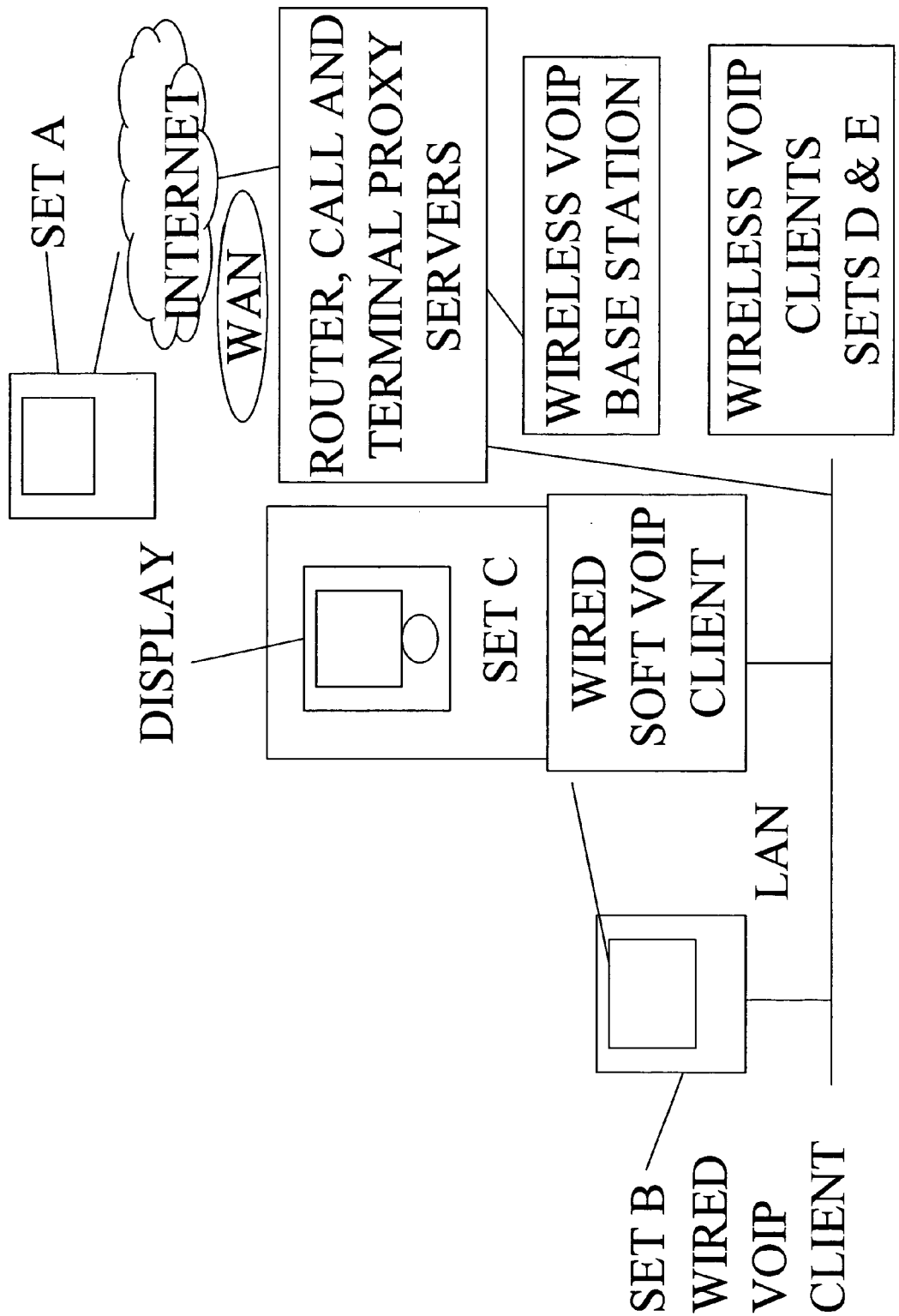

While the following description makes reference to providing call trace information to compatible VoIP devices, the call trace information may be provided to any packet switched network device.

The drawing illustrates a communication network having five VoIP clients. The VoIP clients each include network compatible devices, such as voice communication devices, referred to as sets A, B, C, D & E. The sets may receive voice communications over a packet switched network, such as the Internet.

The configuration depicted in the drawing is illustrative only; any number of communication devices may be employed and different types of networks may be configured instead or in addition to that illustrated. For instance, the user may have a plain old telephone service (POTS) telephone with an adjunct device that connects to a VoIP gateway that is in communication with the Internet or some other IP network.

In the configuration depicted in the drawing, set A talks to set B through a local area network (LAN) and a wide area network (WAN). A call server and a terminal proxy server control sets A, B, C, D & E. Sets C, D & E may be in conference with sets A & B or have separate calls going on at the same time.

Sets D & E, which are wireless VoIP clients, communicate through a wireless VoIP base station with the Sets A, B or C. Set C may be a computer telephony integration with a monitor that displays a VoIP control panel. Set D may be a wireless LAN (802.11) Voice over IP phone with an integral text display capability. Set E may be a third generation wireless digital phone with an integral text and video display capability.

Where the adjunct device for a POTS telephone is being used instead of a VoIP device, the adjunct device would be capable of handling the same type of information that the VoIP device handles.

A user may have a VoIP device or a TDM device (such as one connected through a gateway to a packet switched network). The user of the packet switched network activates the call trace information feature of the present invention. The activation may be by depressing a button, sliding a switch, or entering a feature code. Activation may also be automatic—either at startup, during the entire call, or periodically. If desired, the call trace feature may be remotely activated with a sniffer software that is turned on in the network.

Once activated, call trace information is provided at the user's VoIP or TDM device. If desired, the call trace feature may be configured to present only selected pieces of information. The presentation of the information may be in graphic or numeric, textual or any combination thereof. Where the sniffer software is turned on, the sniffer software monitors and reports this information to security or other authorized recipients.

The call trace information may include the following information about the connected end-point; the IP address, the geographical location of the end-point device and the type or class of the end-point device. In addition, the call trace information may provide the call route and the topology of the route, the domain name server (DNS) of the IP address and route, the directory number and name and the call back number for the user. Further, the call trace information may include whether the IP address for the end-point device is mobile and what redirection may have occurred before the call was completed.

In the case of a conference call, the invention may provide: a feature that enables the call trace information for each of the conferees to be delivered back to the originator of a conference call. Even a circuit switched time division multiplex (TDM) device may activate this feature if it is connected to a VoIP gateway.

An intelligent call log capability may be activated to log all of this call trace information for security or network performance analysis. This capability may be triggered at the time the request for call trace information is received by or acted upon by the terminal proxy server or at the time of receipt of the call trace information by the requesting device.

The implementation of this call trace feature uses ping and net trace tools and makes queries to an Internet Protocol based Private Branch Exchange (IP-PBX) call manager or gateway for information such as directory number (and name) to IP translation and for other parameters such as geographical location, time, etc. The IP translation is a gatekeeper function to provide translation between an IP address and a Name or Directory Number. It serves the same type of function as a Domain Name Server (DNS).

A ping tool includes a routine that sends a packet onto the network and obtains a value of the average delay encountered by that packet in reaching the destination and returning. It also confirms the status of the IP end-point.

A network trace tool includes a routine that captures and records events and states that occur while the network is operating. Events in a trace chronology may be paired, forming event-pairs. An example of an event-pair includes the start and end times.

Implementing the user interface to obtain this call trace information from the IP-PBX call manager or gateway is performed in the same manner implementing any other feature code activated IP-PBX feature.

Most of the call trace information is configured at the time of registration for the VoIP device and stored in a variety of locations or centralized directory and may be accessed using Local Directory Application Protocol (LDAP). As a VoIP device registers with a packet switched network, it is assigned an IP address, a domain name server (DMS) entry, a directory number (DN), a name, and optionally a geographic location that is assigned for static terminals (i.e., those which are at fixed locations and not mobile), and terminal type (e.g., wired, PC based, wireless, etc.). DN, name and terminal type are stored in a call server data base (PBX), while data information such as IP address, DNS entry and other data parameters are stored in a data network server, such as a WINDOWS NT server. The terminal proxy server may retrieve all this information at initial registration of the VoIP device or the terminal proxy server may have dynamic access to this information.

Once the user interface on the VoIP device has been activated, a request signal is sent to the terminal proxy server for call trace information pertaining to an end-point device. In response to the request signal, the terminal proxy server checks its own data base to retrieve the information pertaining to call trace or dynamically retrieves it from the data bases that represent administered data for that end-point device.

The terminal proxy server may supplement the retrieved information by activating a dynamic IP trace against the requested end-point device. The retrieved information is then returned to the VoIP device that requested the call trace information using an agreed upon protocol.

While the foregoing description and drawings represent the preferred embodiments of the present invention, it will be understood that various changes and modifications may be made without departing from the spirit and scope of the present invention.

What is claimed is:

1. Apparatus that obtains call trace information, comprising:
    a network compatible device that is configured to communicate over a packet switched network with an end-point device, the network compatible device being configured to generate a request for call trace information that pertains to the end-point device and to receive the call trace information that was requested and to dynamically display at least a portion of the call trace information that was received.

2. An apparatus as in claim 1, wherein the call trace information is selected from a group consisting of an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

3. An apparatus as in claim 1, wherein the network compatible device is configured to originate a conference call with a plurality of end points and to receive the call trace information for each of the plurality of end-points.

4. An apparatus as in claim 3, wherein the network compatible device is a circuit switched time division multiplex (TDM) compatible device.

5. An apparatus as in claim 1, wherein the network compatible device is a circuit switched time division multiplex (TDM) compatible device.

6. An apparatus as in claim 1, wherein the network compatible device is a voice over Internet Protocol compatible device.

7. An apparatus as in claim 1, further comprising at least one data base containing the call trace information.

8. An apparatus as in claim 2, further comprising a call log that logs all the call trace information.

9. An apparatus that obtains call trace information, comprising:
- a network compatible device that is configured to communicate over a packet switched network with an end-point device, the network compatible device including means for generating a request for call trace information about the end-point device, means for receiving the call trace information that was requested and means for dynamically displaying at least a portion of the call trace information that was received.

10. An apparatus as in claim 9, wherein the call trace information is selected from a group consisting of an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

11. An apparatus as in claim 9, wherein the network compatible device is configured to originate a conference call with a plurality of endpoints and to receive the call trace information for each of the plurality of end-points.

12. An apparatus as in claim 10, wherein the network compatible device is a circuit switched time division multiplex (TDM) compatible device.

13. An apparatus as in claim 9, wherein the network compatible device is a circuit switched time division multiplex (TDM) compatible device.

14. An apparatus as in claim 9, wherein the network compatible device is a voice over Internet Protocol compatible device.

15. An apparatus as in claim 9, further comprising means for storing the call trace information.

16. An apparatus as in claim 9, further comprising means for logging the call trace information.

17. A method that obtains call trace information, comprising:
- communicating over a packet switched network between a network compatible device and an end-point device, generating a request for call trace information that pertains to the end-point device, subsequently receiving the call trace information that was requested, and dynamically displaying at least a portion of the call trace information that was received.

18. An apparatus as in claim 17, wherein the call trace information is selected from a group consisting of an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

19. A method as in claim 18, further comprising logging the call trace information.

20. A method as in claim 18, further comprising storing the call trace information.

21. A method as in claim 18, further comprising originating a conference call with a plurality of end-points and to receive the call trace information for each of the plurality of end-points.

22. A method as in claim 21, wherein the network compatible device is a circuit switched time division multiplex (TDM) compatible device that accesses the packet switched network through a gateway.

23. A method as in claim 18, wherein the network compatible device is a circuit switched time division multiplex (TDM) compatible device that accesses the packet switched network through a gateway.

24. A method as in claim 18, wherein the network compatible device is a voice over Internet Protocol compatible device.

25. An apparatus as in claim 1, further comprising:
- a terminal proxy server, comprising software responsive to a request to download call trace information and to transmit the downloaded call trace information to a network compatible device, the call trace information selected from a group consisting of an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

26. An apparatus as in claim 1, further comprising:
- a terminal proxy server, comprising software responsive to a request for call trace information to dynamically access and then transmit the call trace information to a network compatible device, the call trace information selected from a group consisting of an Internet Protocol (IP) address, a geographical location of the end-point device, a type or class of the end-point device, a call route, a topology of the route, a domain name server of the IP address and route, a directory number and name, a call back number, an advisement as to whether the IP address for the end-point device is mobile and an advisement as to what redirection may have occurred before the call was completed.

* * * * *

UNITED STATES PATENT AND TRADEMARK OFFICE
CERTIFICATE OF CORRECTION

| | |
|---|---|
| PATENT NO. | : 6,937,572 B1 |
| APPLICATION NO. | : 09/751796 |
| DATED | : August 30, 2005 |
| INVENTOR(S) | : Brian B. Egan and Milos Vodsedalek |

It is certified that error appears in the above-identified patent and that said Letters Patent is hereby corrected as shown below:

Claim 18, Column 6, line 1:   delete "An apparatus"
insert --A method--

Signed and Sealed this
Eighteenth Day of September, 2012

David J. Kappos
*Director of the United States Patent and Trademark Office*